Sept. 11, 1945.  R. B. MUFFETT  2,384,561
NON-BACKLASH DEVICE FOR FISHING REELS
Filed April 14, 1944

Robert B. Muffett  INVENTOR.

BY

Victor J. Evans & Co.
ATTORNEYS

Patented Sept. 11, 1945

2,384,561

UNITED STATES PATENT OFFICE 2,384,561

NONBACKLASH DEVICE FOR FISHING REELS

Robert B. Muffett, Merchantville, N. J.

Application April 14, 1944, Serial No. 531,041

2 Claims. (Cl. 242—84.5)

The invention relates to fishing reels, and more especially to anti-backlash means for fishing reels.

An object of the invention is the provision of a device of this character wherein the frame of the fishing reel is provided with a tubular housing having a braking element for contact with the flange of the spool and means for placing the braking element under compression positioned therein.

With these and other objects in view the invention consists in the features of construction, combination and arrangement of parts as will be hereinafter more fully described, illustrated in the accompanying drawing, which shows the preferred form of the invention, and pointed out in the claims hereunto appended.

In the accompanying drawing.

Similar reference characters indicate corresponding parts throughout the several views in the drawing.

Figure 1:
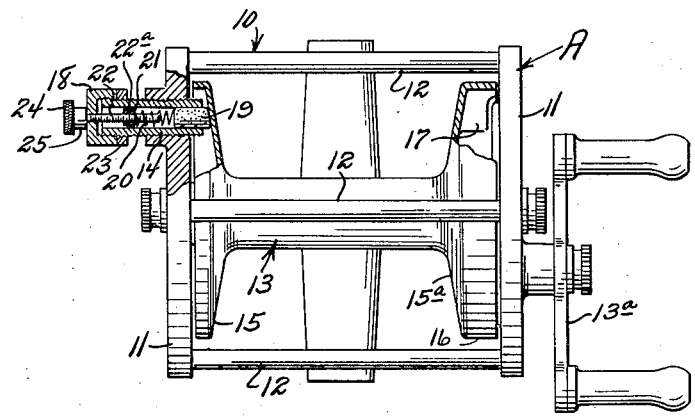
Figure 1 is a side elevation of a fishing reel, partly broken away at determined areas, showing the device constructed in accordance with the invention applied.
Figure 2:
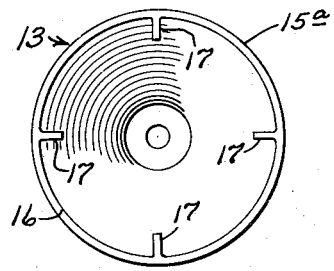
Figure 2 is an end view of the reel spool with the device a part thereof.

Referring to the drawing in detail, A designates generally a fishing reel having a frame 10, provided with side plates 11 connected together by spacing rods 12. A spool 13 is rotatably mounted in the frame 10 and is rotated manually through means comprising gears, not shown, and a handle 13ª. As this means may be of any well known construction a further description is believed to be unnecessary. The side plate 11 remote from the handle 13ª is provided with an opening for receiving the housing 14.

The head 15ª of the spool 13 is formed with a peripheral annular rim 16 which at its outer surface forms a thumb or finger contact for the user of the fishing reel to enable braking action upon the spool 13 when casting so as to prevent overcasting of the line.

The end heads 15 and 15ª are of substantially cup-shape formation, and within the hollow of the head 15ª, at diametrically opposite points of the inner periphery of the rim 16, are fan blades 17, which are integral with the said rim and confronting portion of the head 15ª, the blades being radially disposed to the axis of the spool 13 and clear the gears which form a part of the manual means for turning the reel and which partly extend into the head 15ª.

The housing 14 is of tubular formation and is externally screw threaded for engagement with the plate 11 and for the reception of a cap 18. A friction element 19 slidable within the housing 14, contacts with the outer face of the spool head 15, and is constantly urged in the direction of the head by a coil spring 20. The spring 20 bears at one end against the friction element 19 and at the other end against a nut 21 on a bolt 22 extending through and screw-threadedly engaged with the cap 18. The bolt 22 extends into the spring 20, and the nut 21 is secured in its adjusted position on the bolt by a lock nut 22ª. The cap 18 is secured in its adjusted position on the housing 14 by a lock nut 23. The compression of the spring 20 is regulated through the adjustment of the cap 18 and nut 21. The spring 20 may be easily and quickly released from compression by turning the bolt 22 back, when it is desired to free the spool 13 for control manually and by the blades 17. When it is desired to place the spool 13 under control of the friction element, the bolt 22 is turned up. The bolt 22 may be conveniently operated through the medium of its head 24. When the spring 20 is under compression the head 24 of the bolt 22 contacts with a boss 25 on the cap 18, the head being larger diametrically than the boss to permit it to be easily grasped.

The fan blades 17 function to avoid the overrunning of the line in casting and thus effect an anti-backlash device for the spool 13, as a slight tension is always on the backlash and the blades assist in the first part of the cast as the spool 13 must be turning at high speed for the blades to be of value and at the end of the cast as the spool slows down the friction on the backlash stops the spool and prevents an overrun.

The thumb or finger contact and the fan blades assure perfect control of the spool 13 to eliminate overcasting and backlash thereto.

What is claimed is:

1. An anti-backlash device for a fishing reel having a frame and a flanged spool rotatable in the frame, comprising a tubular housing carried by the frame, a friction element slidable in the housing and contacting with one flange of the spool, a coil spring within the housing bearing against the friction element, a cap adjustably mounted on the housing, a bolt adjustably carried by the cap and extending into the housing, a nut adjustable on the bolt and contacting with the spring, and means for locking the cap and nut in adjusted position.

2. A device of the character set forth in claim 1, wherein the bolt is provided with a head by means of which it may be turned back to free the spring of compression, and wherein the cap is provided with a boss with which the head and the bolt contact when the spring is under compression.

ROBERT B. MUFFETT.